United States Patent
Regier et al.

(10) Patent No.: US 11,856,895 B2
(45) Date of Patent: Jan. 2, 2024

(54) BALER SLACKER ARM SENSOR FOR PROTECTING AGAINST NEEDLE OVER-TENSION CONDITIONS

(71) Applicant: AGCO Corporation, Duluth, GA (US)

(72) Inventors: Bernard D. Regier, Newton, KS (US); Dino Rey Valdez, Hesston, KS (US); Maynard M. Herron, Hesston, KS (US); Patrick Kendrick, Hesston, KS (US); Nathan Ensminger, Hutchinson, KS (US)

(73) Assignee: AGCO Corporation, Duluth, GA (US)

( * ) Notice: Subject to any disclaimer, the term of this patent is extended or adjusted under 35 U.S.C. 154(b) by 552 days.

(21) Appl. No.: 17/137,541

(22) Filed: Dec. 30, 2020

(65) Prior Publication Data
US 2021/0195844 A1    Jul. 1, 2021

Related U.S. Application Data

(60) Provisional application No. 62/954,827, filed on Dec. 30, 2019.

(51) Int. Cl.
*A01F 15/14*    (2006.01)

(52) U.S. Cl.
CPC .......... *A01F 15/148* (2013.01); *A01F 15/145* (2013.01)

(58) Field of Classification Search
CPC ...... A01F 15/14; A01F 15/145; A01F 15/148; A01F 15/08; A01F 2015/108; A01D 59/04
See application file for complete search history.

(56) References Cited

U.S. PATENT DOCUMENTS 6,321,851 B1    11/2001    Weiss et al.
8,671,834 B1 *    3/2014    Rotole ................... B65H 59/36
                                                  100/32
(Continued)

FOREIGN PATENT DOCUMENTS

BE    1021139 B1 *    1/2016    ......... A01F 15/0858
FR    2698517 A1    6/1994

OTHER PUBLICATIONS

Translation of BE-1021139 (Year: 2016).*
UK Intellectual Property Office, Search Report for related UK Application No. GB2000213.5, dated Jul. 8, 2020.

*Primary Examiner* — Bobby Yeonjin Kim

(57) ABSTRACT

A bale binding mechanism is configured to wrap twine around a bale of severed crop material. The bale binding mechanism broadly includes a baling needle, a twine tensioner, and a sensor. A baler chassis presents a baling chamber in which the bale is formed. The baling needle is shiftable up and down relative to the baling chamber, with the needle being shiftable to advance twine upwardly along an end of the bale. The twine tensioner is configured to maintain tension on a tensioned twine section extending between the twine tensioner and the needle, with the tensioned twine section defining a twine feed axis. The twine tensioner includes a tension device that restricts upward advancement of the tensioned twine section. The twine tensioner also includes a shiftable guide element. The guide element is shiftable into and out of a twine feed position associated with upward advancement of the twine section, with the guide element operable to define an offset twine section offset from the twine feed axis in the twine feed position. The sensor is operably associated with the guide element to sense guide element movement corresponding to a twine over-tension condition, with the bale binding mechanism restricting twine from being passed out of the twine (Continued)

tensioner in response to the sensed twine over-tension condition.

13 Claims, 9 Drawing Sheets

(56) References Cited

U.S. PATENT DOCUMENTS

| | | |
|---|---|---|
| 2002/0125018 A1 | 9/2002 | Bernhardt et al. |
| 2005/0056438 A1 | 3/2005 | Nordhoff |
| 2009/0084566 A1 | 4/2009 | Claas et al. |
| 2021/0195843 A1* | 7/2021 | Regier .................... A01F 15/12 |

* cited by examiner

BALER SLACKER ARM SENSOR FOR PROTECTING AGAINST NEEDLE OVER-TENSION CONDITIONS

CROSS REFERENCE TO RELATED APPLICATION

This application claims the benefit of U.S. Provisional Application No. 62/954,827, filed Dec. 30, 2019, which is hereby incorporated by reference in its entirety.

BACKGROUND

1. Field

The present invention relates generally to agricultural baling equipment. More specifically, embodiments of the present invention concern a bale binding mechanism with a baling needle and a twine tensioner configured to protect the baling needle from a twine over-tension condition.

2. Discussion of Prior Art

Powered agricultural balers are commonly used to bind severed hay material and other severed crop material into bales for later use, such as feeding of livestock. Square balers that use twine (or other strands of binding material) to bind loose material into a bale generally include a needle assembly to wrap strands of twine around each formed bale and secure the twine. Conventional balers are also provided with a tensioning mechanism to maintain twine tension as the needles move into and out of the baling chamber.

However, conventional balers with needles and tensioning devices have various deficiencies. For instance, prior art needles and tensioning devices are complex mechanical assemblies that are subject to wear and require frequent maintenance. Prior art needles are also prone to damage from excessive twine tension, if twine flow is impeded by a malfunction. With the development of high-strength baling twines, much higher twine tension may be experienced during baling operations. When twine becomes over-tensioned during the bale-forming process, the twine can transmit enough force to a needle to cause the needle end to deflect laterally. Such deflection can cause catastrophic damage to the needle assembly and other components of the baler.

This background discussion is intended to provide information related to the present invention which is not necessarily prior art.

SUMMARY

The following brief summary is provided to indicate the nature of the subject matter disclosed herein. While certain aspects of the present invention are described below, the summary is not intended to limit the scope of the present invention.

Embodiments of the present invention provide a bale binding mechanism that does not suffer from the problems and limitations of the prior art devices set forth above.

One aspect of the present invention concerns a bale binding mechanism configured to wrap twine around a bale of severed crop material. The bale binding mechanism broadly includes a baling needle, a twine tensioner, and a sensor. A baler chassis presents a baling chamber in which the bale is formed. The baling needle is shiftable up and down relative to the baling chamber, with the needle being shiftable to advance twine upwardly along an end of the bale. The twine tensioner is configured to maintain tension on a tensioned twine section extending between the twine tensioner and the needle, with the tensioned twine section defining a twine feed axis. The twine tensioner includes a tension device that restricts upward advancement of the tensioned twine section. The twine tensioner also includes a shiftable guide element. The guide element is shiftable into and out of a twine feed position associated with upward advancement of the twine section, with the guide element operable to define an offset twine section offset from the twine feed axis in the twine feed position. The sensor is operably associated with the guide element to sense guide element movement corresponding to a twine over-tension condition occurring upstream of the sensor, with the bale binding mechanism restricting twine from being passed out of the twine tensioner in response to the sensed twine over-tension condition.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 8:
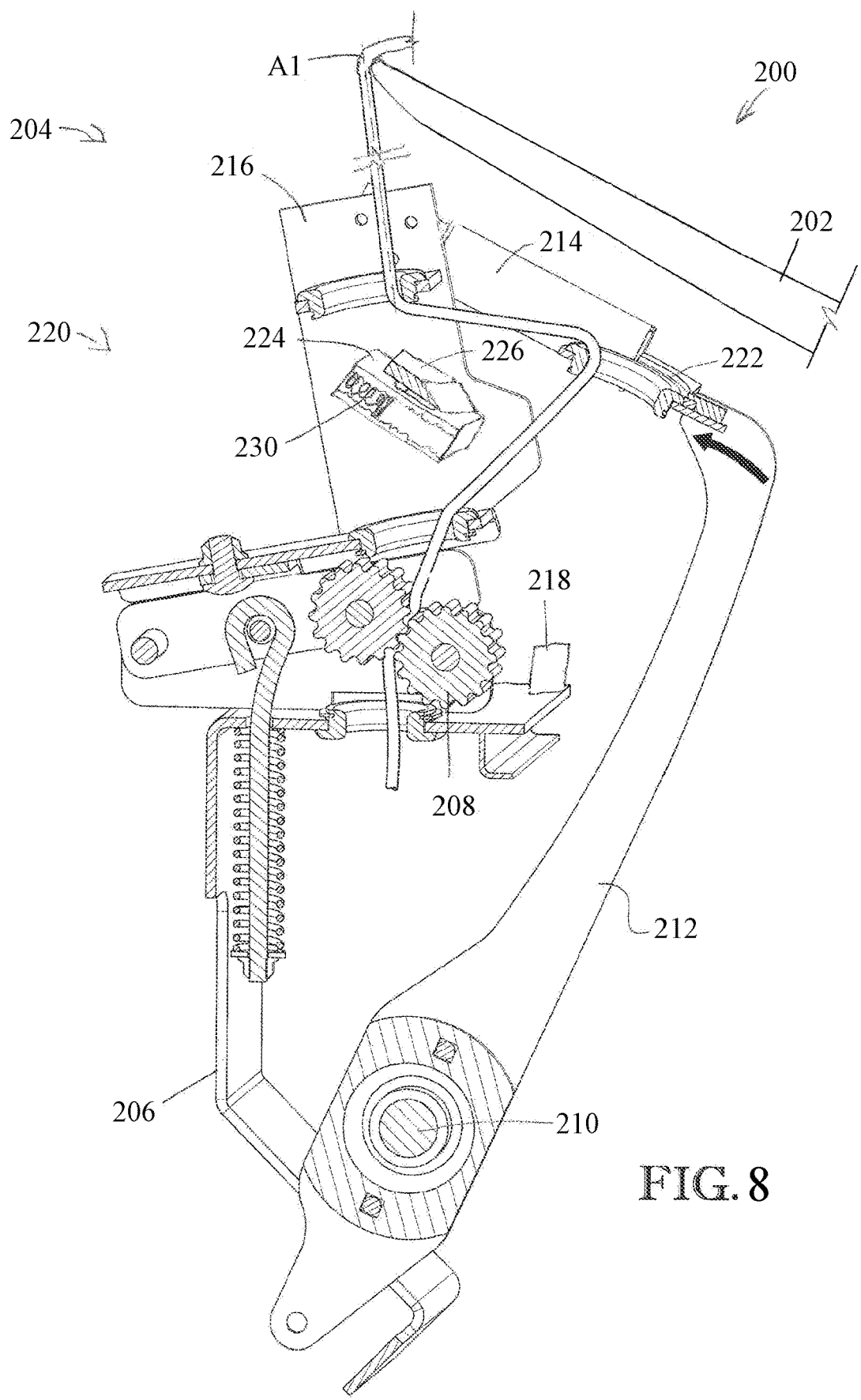
Figure 9:
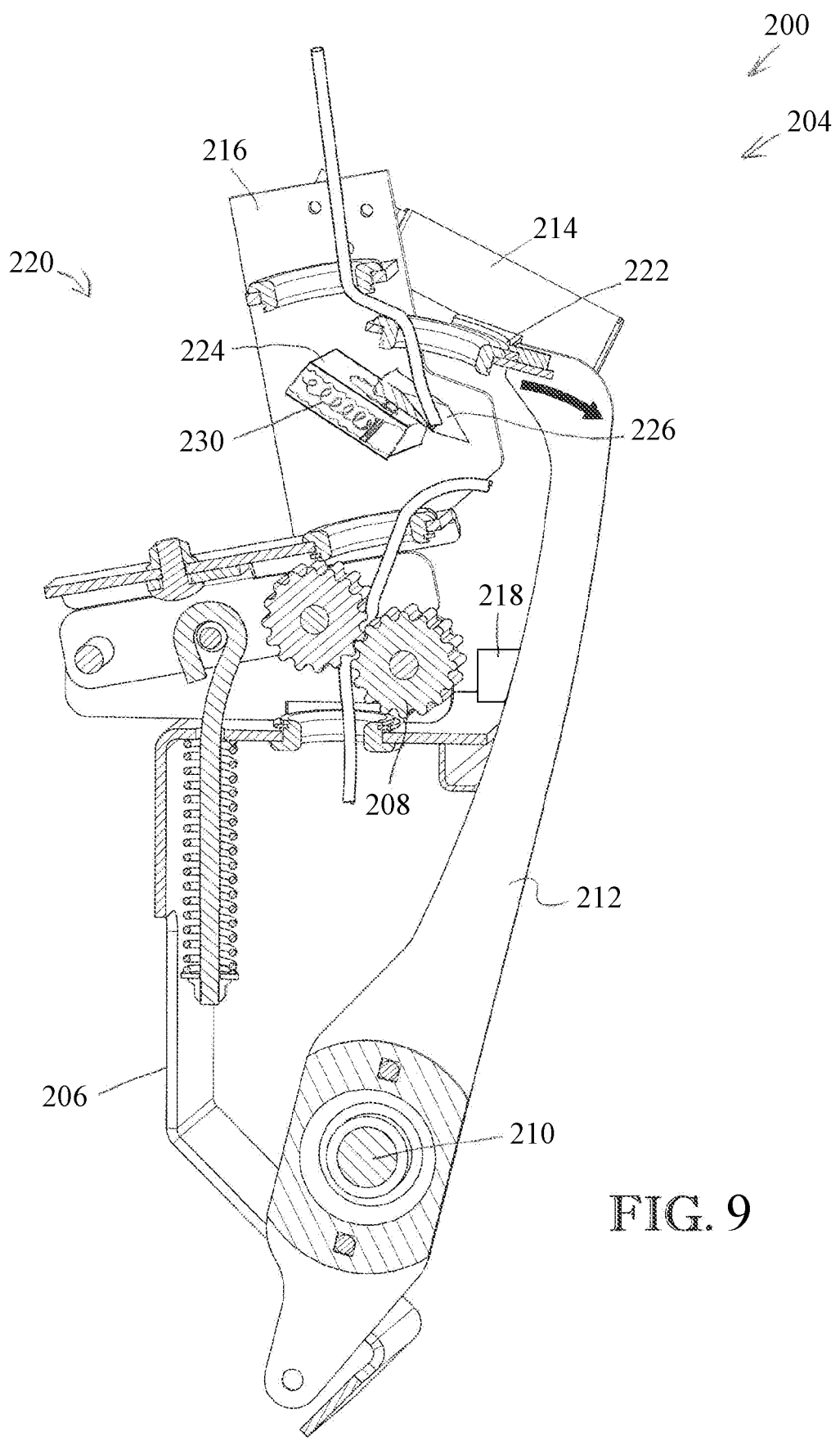

FIG. 8 is a fragmentary side elevation of a baler constructed in accordance with a second embodiment of the present invention, with the baler including, among other things, a needle assembly and a twine tensioner, showing the twine tensioner in a twine feed position and the needle assembly advancing twine upwardly toward a baling chamber; and FIG. 9 is a cross-sectional view of the twine tensioner similar to FIG. 8, but showing the slacker arm shifted from the twine feed position to the severed twine position and a blade actuated to sever the twine.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Figure 1:
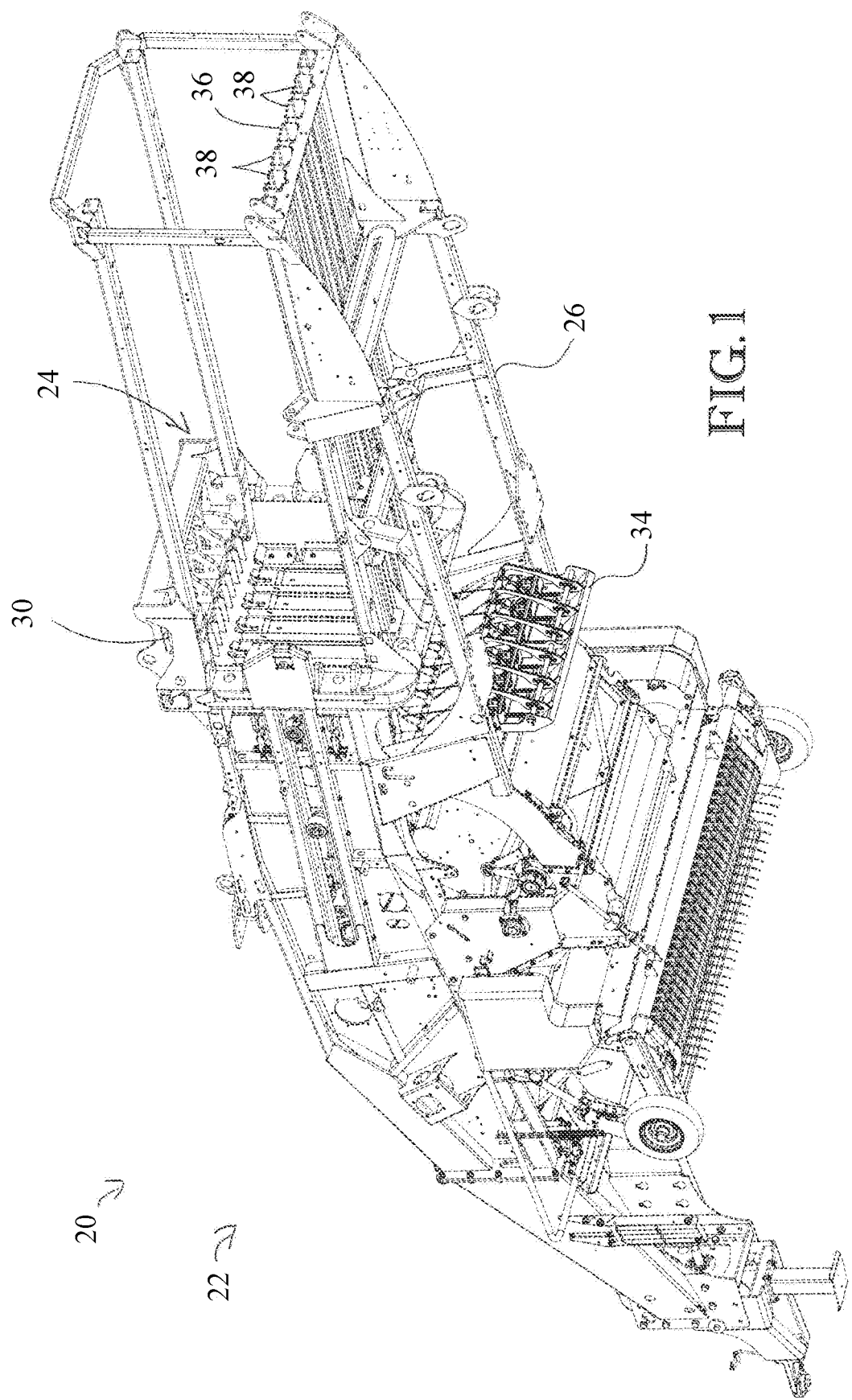
FIG. 1 is a fragmentary perspective of a baler constructed in accordance with a preferred embodiment of the present invention, with the baler including a chassis, knotter mechanism, needle assembly, and twine tensioner.

Turning to FIG. 1, an agricultural baler 20 is configured to collect severed crop material (not shown) from a field and form a series of bales (not shown) from the severed crop material. The baler 20 preferably provides a bale binding mechanism 22 configured to secure strands of binding material, such as twine T, around a bale of severed crop material (not shown).

Preferably, the bale binding mechanism 22 is provided as part of the baler 20, which can be advanced along a field to collect severed crop material. In the usual manner, the baler 20 is generally towed by a powered tractor (not shown), or other self-powered vehicle, so as to be advanced along a windrow of severed crop material. As the baler 20 is advanced, a pickup mechanism (not shown) of the baler 20 collects the windrow and directs the windrow material into a baling chamber 24 defined at least in part by a baler chassis 26. The bale binding mechanism 22 preferably includes a knotter mechanism 30, a needle assembly 32 (see FIG. 6), and a twine tensioner 34 (see FIGS. 1-3 and 6).

The baler chassis 26 is configured to support the baler pickup mechanism (not shown) and other operating components. The baler chassis 26 includes, among other things, a baler frame 36 that presents the baling chamber 24.

The baler frame 36 is preferably conventional and includes a series of fore-and-aft extending frame members 38 (see FIG. 1) that at least partly define the baling chamber 24 and direct severed crop material through the baling chamber 24 as the material is formed into bales (not shown). In the illustrated embodiment, the baler frame 36 also operably supports the knotter mechanism 30, needle assembly 32, and twine tensioner 34. For each bale (not shown) formed by the baler 20, the baler frame 36 receives and forms the bale in the baling chamber 24 as strands of twine T are secured around the bale.

Figure 2:
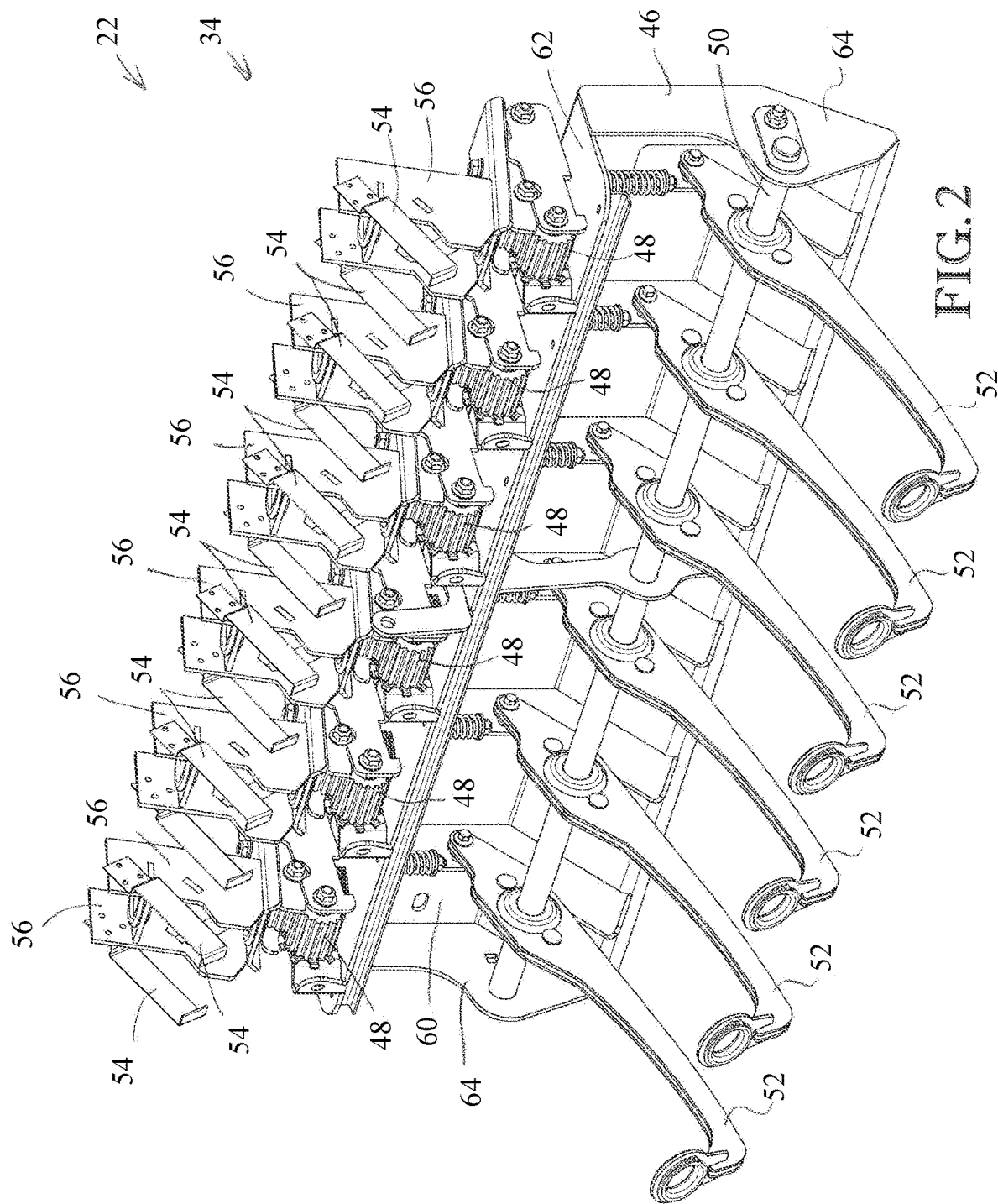
FIG. 2 is a perspective of the twine tensioner shown in FIG. 1, depicting a tensioner frame, tension devices, support shaft, slacker arms, locating arms, and twine cutters that cooperatively provide a series of tensioning stations, with the slacker arms being in a twine slack position.
Figure 3:
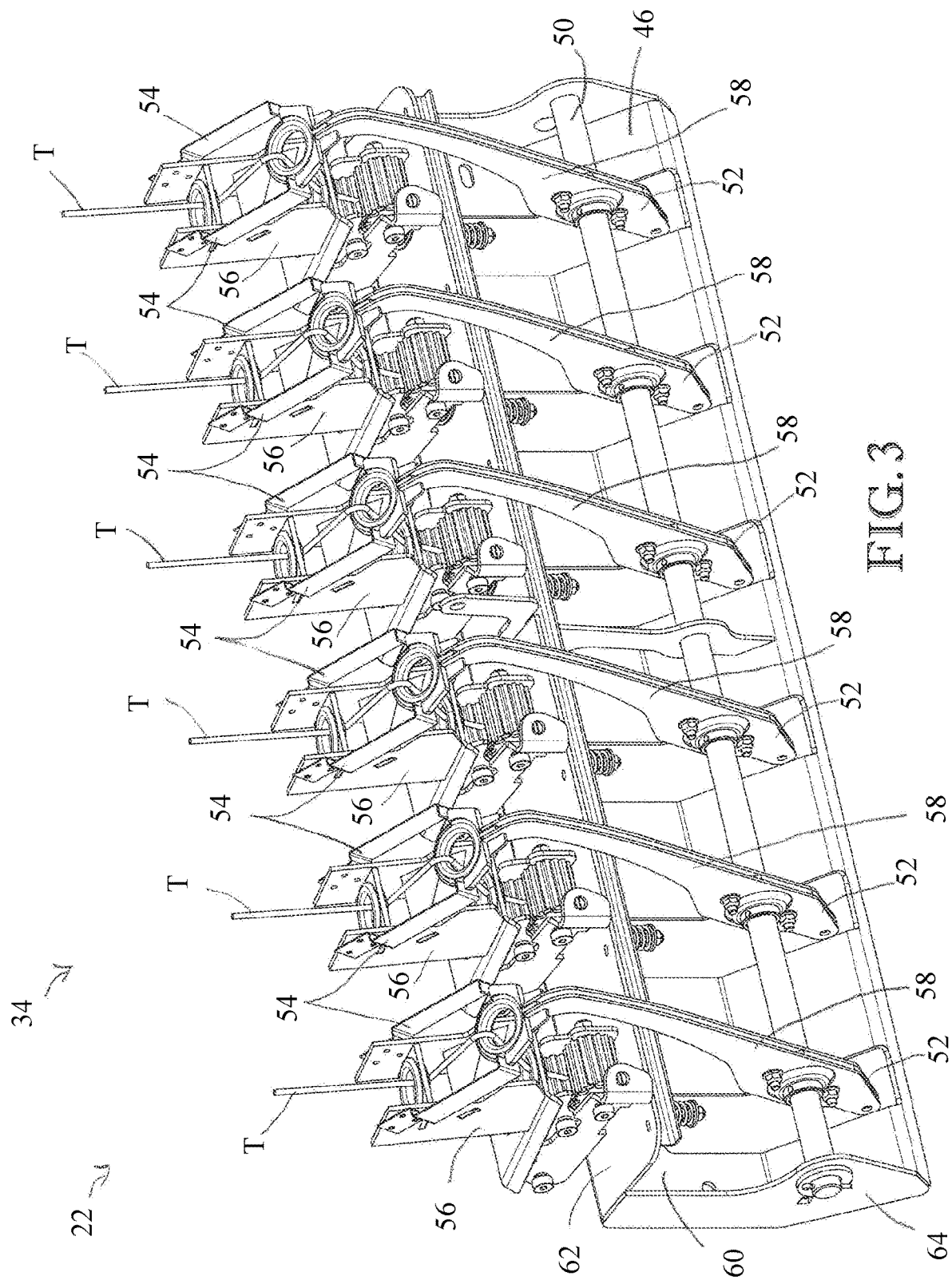
FIG. 3 is a perspective of the twine tensioner similar to FIG. 2, but showing strands of twine extending through the twine tensioner and the slacker arms in a twine feed position.

Turning to FIGS. 1-3, the knotter mechanism 30 and needle assembly 32 are configured to be driven by a drive shaft (not shown) for binding bales in the baling chamber 24. In the usual manner, the knotter mechanism 30 includes a series of knotter heads (not shown) that cooperate with the needle assembly 32 to form at least one knot in respective strands of twine T. The needle assembly 32 includes a series of needles 40 each associated with a respective strand of twine T passing through the respective twine tensioners 34 (see FIG. 6). Each needle 40 is configured to advance twine T vertically along an end of the bale (see FIG. 6). The needle 40 presents a distal needle end 42 that receives and supports the twine T during operation.

The needles 40 are shiftable relative to the baling chamber 24 during a bale tie cycle. In the depicted embodiment, the needles 40 are shiftable upwardly into the baling chamber 24 during an advancement stroke to advance strands of twine T upwardly along an end of the bale. The needles 40 position the strands of twine T so that the knotter mechanism 30 can secure the twine T around the bale.

The needles 40 are also shiftable downwardly out of the baling chamber 24 during a return stroke to permit formation of the next bale. As the needles 40 shift out of the baling chamber 24, the twine tensioner 34 is operable to take up any excess amount of twine T, as explained below.

Although the present description references upward and downward directions associated with the needles 40 and other baler components, it will be appreciated that the present invention broadly covers various orientations and movements of baler components. For instance, it is within the scope of at least some aspects of the present invention for the needle assembly to be alternatively positioned relative to the baling chamber (e.g., above the chamber) while being configured to form bales of severed crop material.

Turning to FIGS. 2-7, the twine tensioner 34 is configured to maintain tension on a tensioned twine section 44. The tensioned twine section 44 extends between the twine tensioner 34 and the distal needle end 42 of the needle 40 and defines a twine feed axis A1. The illustrated twine tensioner 34 preferably includes a tensioner frame 46, tension devices 48, support shaft 50, slacker arms 52, locating arms 54, and twine cutters 56.

The twine tensioner 34 includes a series of tensioning stations 58 spaced along the tensioner frame 46. Each station 58 is preferably associated with a respective twine strand T and is configured to affect twine advancement. The tensioning station 58 preferably includes a respective tension device 48, slacker arm 52, a pair of locating arms 54, and twine cutter 56. Because the stations 58 have generally the same configuration, it will be understood that the description of any one station generally applies to the other stations.

The tensioner frame 46 is a conventional structure for supporting the other components of the twine tensioner 34. The depicted tensioner frame 46 includes an upright wall 60, an upper base wall 62, and opposite end walls 64. The tensioner frame 46 also includes a plurality of grommets 66 associated with the stations 58 and spaced along the base wall 62. Each grommet 66 presents a respective lower guide opening 66a to receive twine T (see FIGS. 6 and 7).

Turning to FIGS. 4-7, the tension device 48 is operable to restrict upward advancement of the tensioned twine section 44. In the depicted embodiment, the tension device 48 preferably includes a frame 68, upper and lower gears 70,72, and a spring 74. The frame 68 generally supports the gears 70,72 and permits the gears 70,72 to shift toward and away from each other. The frame 68 includes upper and lower frame members 68a,68b pivotally attached to one another at a pivot joint 75. The pivot joint 75 allows the upper frame member 68a to swing vertically relative to the lower frame member 68b.

Figure 6:
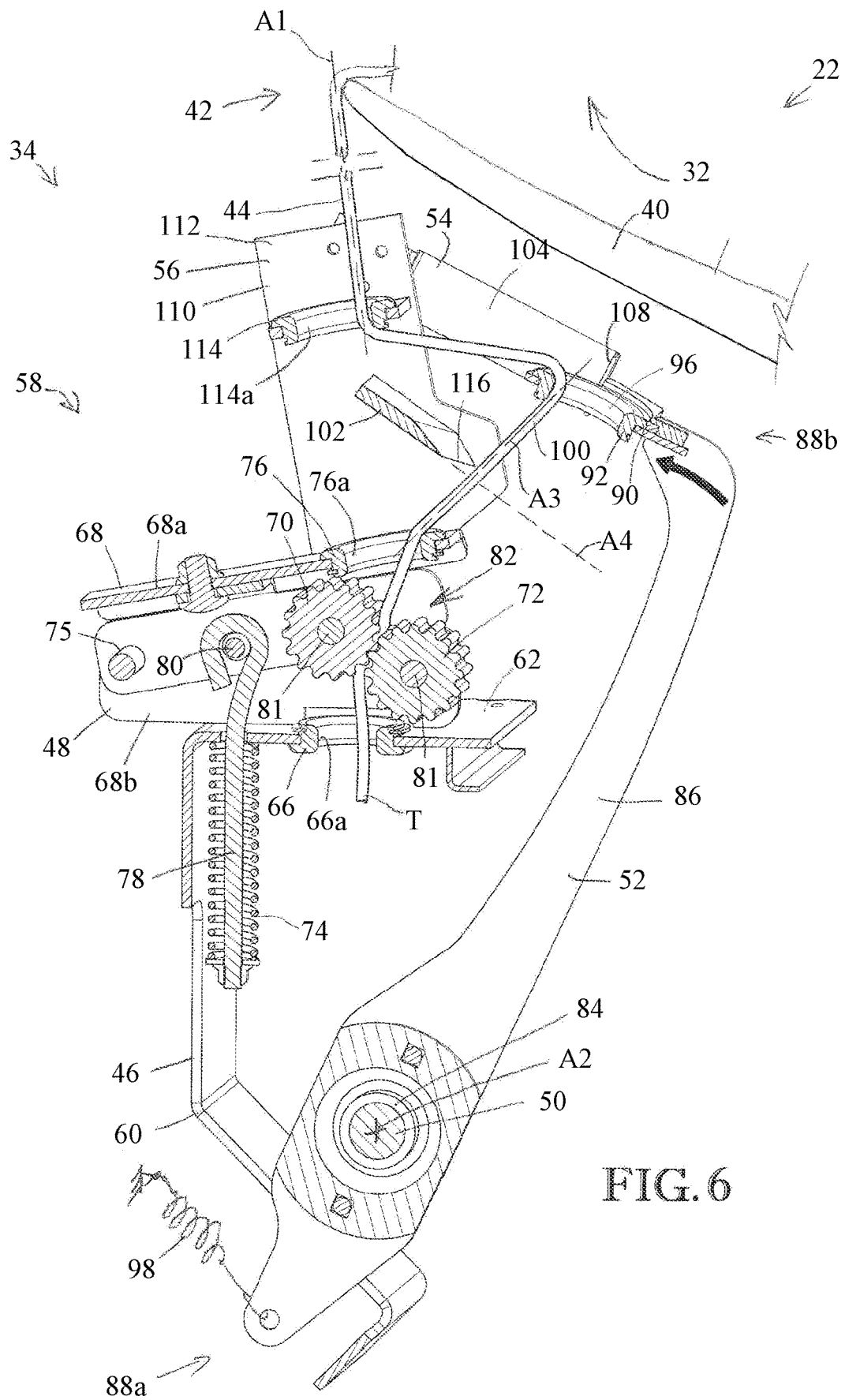
FIG. 6 is a fragmentary side elevation of the baler shown in FIGS. 1-5, with the twine tensioner being cross-sectioned to depict components of the twine tensioner associated with the twine feed position, and showing a needle assembly advancing twine upwardly toward a baling chamber.

The upper frame member 68a includes a grommet 76 that presents an upper guide opening 76a (see FIG. 6). The lower frame member 68b is fixed to the tensioner frame 46 and is associated with the upper frame member 68a and grommet 76 so that the upper guide opening 76a overlies the lower guide opening 66a. Thus, the frame 68 is oriented so that the twine T is permitted to extend through both guide openings 66a,76a at the same time.

The spring 74 is supported relative to the upper frame member 68a with an eye bolt 78 and a fastener 80 (see FIG. 6). The depicted spring 74 generally urges the upper frame member 68a downwardly against the lower frame member 68b.

The gears 70,72 are configured to receive the twine T in frictional engagement therebetween to restrict upward advancement of the tensioned twine section 44. The depicted gears 70,72 are rotatably supported on respective frame members 68a,b by fasteners 81 and operable to spin relative to the frame members 68a,b (see FIGS. 5 and 6).

Figure 7:
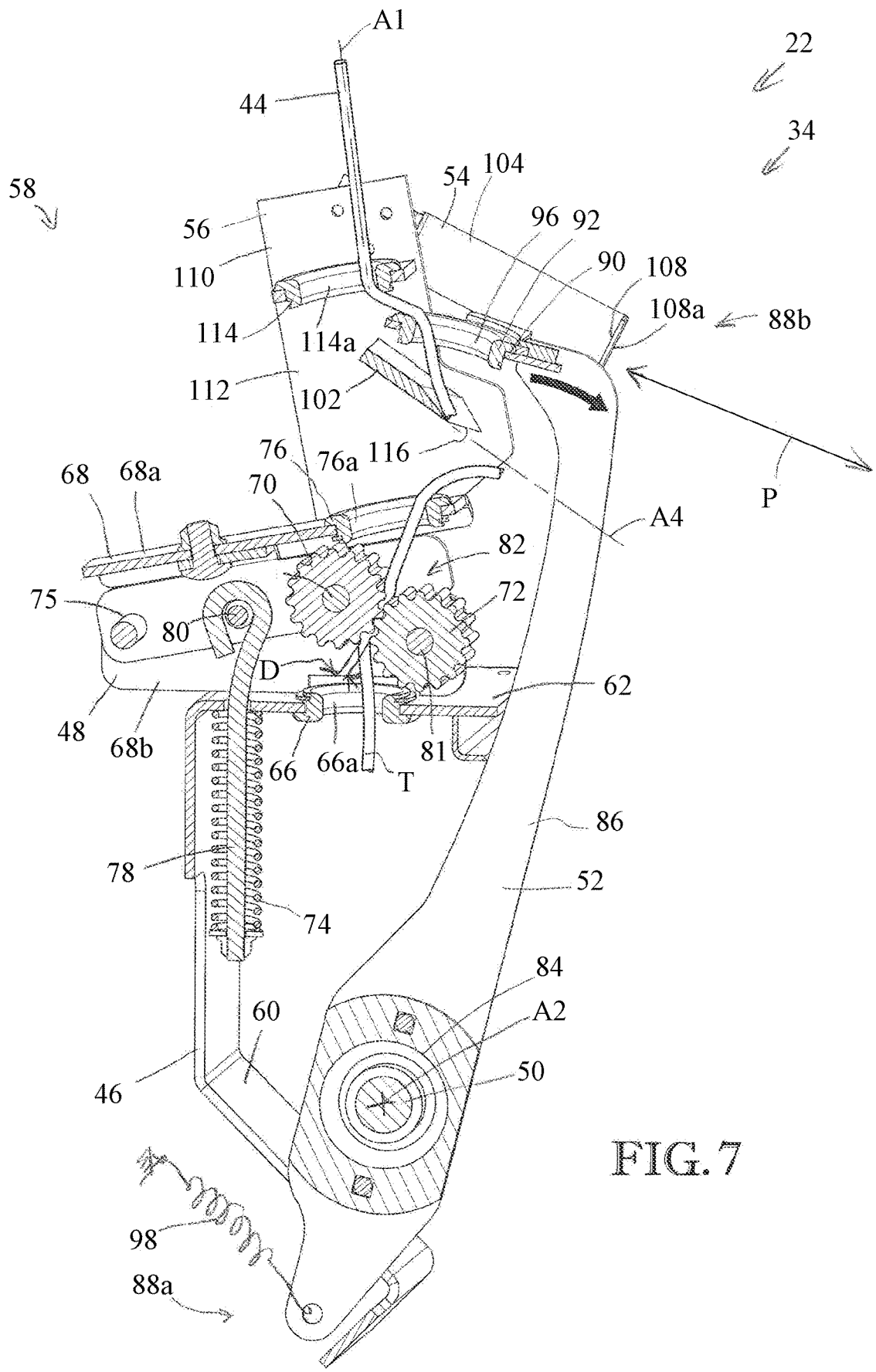
FIG. 7 is a cross-sectional view of the twine tensioner similar to FIG. 6, but showing the slacker arm shifted from the twine feed position to the severed twine position.

The gears 70,72 cooperatively define a passage 82 therebetween to receive the twine T (see FIGS. 6 and 7). The gears 70,72 are generally intermeshed with each other as twine T extends through the passage 82. It will be appreciated that the gears 70,72 frictionally engage parts of the twine T within the passage 82 but may or may not contact one another.

The upper frame member 68a and upper gear 70 are configured to shift vertically relative to the lower frame member 68b. The passage 82 has a variable spacing dimension D (see FIG. 7) that corresponds to the spacing between the gears 70,72. The spacing dimension D increases as the upper frame member 68a shifts away from the lower frame member 68b and decreases as the upper frame member 68a shifts toward the lower frame member 68b.

During use, the upper frame member 68a and upper gear 70 are configured to shift relative to the lower frame member 68b as twine is advanced upwardly through the passage 82. The spring 74 applies a force to the upper frame member 68a and generally urges the upper frame member 68a downwardly so that the gears 70,72 are urged toward each other. Consequently, the spring 74 urges the gears 70,72 into frictional engagement with the twine T. At the same time, the spring 74 permits the upper frame member 68a and upper gear 70 to shift upwardly and away from the lower gear 72 as twine T is advanced upwardly (i.e., paid out) through the passage 82.

In the depicted embodiment, the slacker arms 52 are each swingably supported relative to the tensioner frame 46 on the support shaft 50. More particularly, the slacker arms 52 are swingably supported on the shaft 50 at respective arm pivot joints 84 to swing about an arm axis A2 transverse to the twine feed axis A1 (see FIGS. 6 and 7). Each slacker arm 52 is swingable independently of the other slacker arms 52 into and out of the twine feed position. The slacker arm 52 includes an elongated body 86 extending between proximal and distal ends 88a,b. The slacker arm 52 also includes a guide element 90 supported by the body 86 adjacent the distal end 88b.

The illustrated guide element 90 includes a grommet 92. The guide element 90 also preferably presents a pair of shoulders 94a and a pair of cam surfaces 94b (see FIGS. 4 and 5). The grommet 92 presents a guide opening 96 to receive the twine T. As the slacker arm 52 swings about the arm axis A2, the guide element 90 moves along an arm path P that extends in a lateral direction relative to the twine feed axis A1 (see FIG. 7).

The twine tensioner 34 also includes springs 98 associated with respective slacker arms 52 (see FIGS. 6 and 7). Each spring 98 is attached to the proximal end 88a of a respective slacker arm 52 and is operable to bias the slacker arm 52 so that the guide element 90 is urged away from the twine feed axis A1.

The slacker arm 52 is swingable into and out of a twine feed position associated with upward advancement of the tensioned twine section 44. In the twine feed position, the guide element 90 positions the twine T to define an offset twine section 100 offset from the twine feed axis A. The offset twine section 100 defines an offset twine axis A3 arranged at an oblique angle to the twine feed axis A1 (see FIG. 6).

The slacker arm 52 is also operable to swing into and out of a twine slack position (see FIG. 2), where the guide element 90 is spaced farther from the twine feed axis A1 when compared to the twine feed position. As will be explained, positioning of the slacker arm in the twine slack position, the twine feed position, and positions there between correspond with shifting of the needles through the baling chamber or after a strand of twine has been severed.

The depicted slacker arm 52 is configured to swing into a severed twine position when the guide element 90 shifts out of the twine feed position toward the twine feed axis A1 (see FIG. 7). In the depicted embodiment, the slacker arm 52 is swingable so that the guide element 90 swings alongside a blade 102 of the twine cutter 56, when the guide element 90 shifts out of the twine feed position toward the twine feed axis A1.

As discussed below, the slacker arm 52 is configured to swing out of the twine feed position toward the severed twine position during an over-tension condition (see FIG. 7). The slacker arm 52 preferably engages the tensioner frame 46 (when in the severed twine position) at a location spaced from the arm pivot joint 84, thereby restricting further movement of the guide element 90 toward the twine feed axis A1. The slacker arm 52 is configured to swing away from the severed twine position, particularly when the twine T is severed, as explained below.

During use, the slacker arm 52 is configured to swing between the twine feed position (see FIGS. 3-6) and the twine slack position (see FIG. 2). For instance, as the needles 40 shift into the baling chamber 24 during the advancement stroke of the bale tie cycle, twine T is advanced upwardly through the twine tensioner 34. During advancement of the twine T, the twine T is tensioned and urges the slacker arm 52 into the twine feed position. Specifically, the twine T applies a force to the guide element 90 that counteracts the force applied by the spring 98.

As the needles 40 shift out of the baling chamber 24 during a return stroke of the bale tie cycle, the distal needle end 42 moves toward the twine tensioner 34, which may develop an excess amount of twine T between the needle and the twine tensioner 34. The slacker arm 52 is operable to take up any excess amount of twine T by swinging outwardly toward the twine slack position. In particular, as tension within the twine T is reduced due to excess twine T, the spring 98 urges the slacker arm 52 to swing toward the twine slack position. As a result, the slacker arm 52 cooperates with the spring 98 to maintain tension in the twine T during the return stroke.

The locating arms 54 are operable to engage the respective guide element 90 in the twine feed position and restrict some swinging of the slacker arm 52. In particular, the locating arms 54 are operable to restrict swinging of the slacker arm 52 associated with shifting of the guide element 90 out of the twine feed position toward the severed twine position (see FIG. 7). As will be explained, the locating arms 54 permit the slacker arm 52 to swing out of the twine feed position toward the severed twine position during an over-tension condition.

In the depicted embodiment, the locating arm 54 preferably comprises a unitary, flexible structure that includes a flexible body 104, a mounting tab 106, and a stop 108. The stop 108 comprises a tab that contacts the guide element 90 in the twine feed position (see FIGS. 4-6). The body 104 supports the stop 108 and permits the stop 108 to move out of contact with the guide element 90 as the twine over-tension condition causes the guide element 90 to shift out of the twine feed position toward the twine feed axis A1 (see FIG. 7).

The locating arm 54 preferably includes a unitary material strip that is flexible. More preferably, the material strip includes a metallic material, such as carbon steel or stainless steel. The material strip is also preferably resilient so that at least the body 104 of the locating arm 54 operates similar to a spring. However, one or more locating arms could be alternatively configured for certain aspects of the present invention.

The locating arms 54 are arranged so that the flexible body 104 extends along the arm path P (see FIG. 7). The locating arm 54 preferably positions the stop 108 at a location spaced laterally along the arm path P from the twine feed axis A1. As explained below, the locating arms 54 are preferably mounted on the twine cutters 56.

Figure 4:
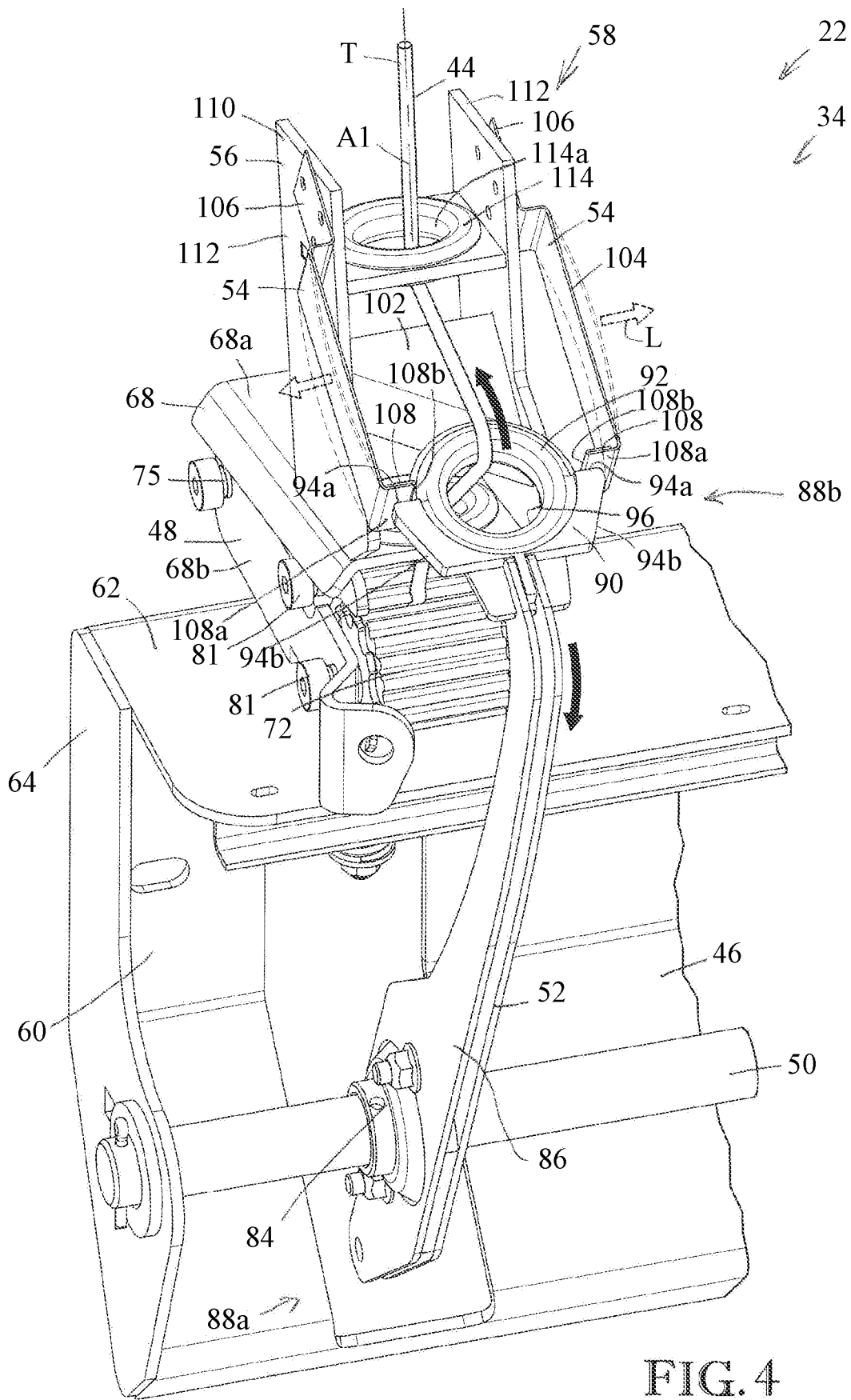
FIG. 4 is a fragmentary perspective of the twine tensioner shown in FIGS. 1-3, showing one of the slacker arms urged against the locating arms by a tensioned strand of twine.

In the depicted embodiment, the locating arm 54 is configured so that the stop 108 and the mounting tab 106 are laterally offset from the flexible body 104 (see FIG. 4). More specifically, the stop 108 and the mounting tab 106 are at least partly located from the body 104 in an outboard lateral direction L that is transverse to the arm path P. With this construction, the flexible body 104 is configured to be flexed laterally along the lateral direction L as the guide element 90 presses against the stop 108, as described further below.

For at least some aspects of the present invention, the locating arm could include an alternative configuration (e.g., to facilitate suitable operation of the slacker arm). For instance, the flexible body of the locating arm could be alternatively constructed to support the stop and permit flexing of the arm (e.g., as the guide element shifts out of the twine feed position toward the twine feed axis A1).

Similarly, one or more locating arms could be alternatively positioned as part of the twine tensioner. For example, the locating arm could be positioned to engage another part of the locating arm (e.g., a location spaced from the guide element). Although each depicted station includes a pair of locating arms, one or more stations could be associated with a single locating structure.

With respect to some aspects of the present invention, an alternative locating structure could be configured to control movement and/or positioning of one or more guide elements. For instance, one or more guide elements could be associated with a spring-loaded ball detent mechanism. Alternative embodiments of a twine tensioner could include a locating mechanism incorporated into the pivot joint supporting the slacker arm.

Each twine cutter 56 is preferably configured to sever the offset twine section 100 when a twine over-tension condition causes the guide element 90 to shift out of the twine feed position toward the twine feed axis A1. This operation of the depicted twine tensioner 34 is a preferred functional objective, although it will be appreciated that the twine tensioner provides additional features and enables other objectives. As described below, when the twine T has been severed due to an over-tension condition, operation of the baler 20 is preferably stopped to allow baler maintenance. The illustrated twine cutter 56 includes a cutter frame 110 supported by the tension device 48 and the blade 102. The frame 110 is supported by the tension device, and the blade is operably mounted on the cutter frame 110.

The illustrated cutter frame 110 includes a pair of walls 112 that are preferably fixed to the upper frame member 68a (see FIG. 4). The blade 102 is fixed to and interconnects the walls 112. The twine cutter 56 also preferably includes a grommet 114 supported by the walls 112 to position the tensioned twine section 44. The grommet 114 presents a guide opening 114a to receive the twine T.

In the depicted embodiment, the blade 102 comprises a unitary structure with a sharpened blade edge 116. The blade 102 is oriented to define a cutting axis A4 (see FIGS. 6 and 7). The cutting axis A4 preferably extends at an oblique angle to the offset twine axis A3, when the blade 102 severs the offset twine section 100. The blade 102 is also preferably located between the grommet 76 and grommet 114.

The locating arms 54 are preferably mounted on the cutter frame 110 to restrict swinging of the slacker arm 52. In particular, the mounting tabs 106 are fixed to respective walls 112 of the cutter frame 110. The locating arms 54 are oriented so that each flexible body 104 is laterally outboard relative to the corresponding mounting tabs 106 and stops 108. Further, the locating arms 54 are oriented so that stop surfaces 108a of the stops 108 are generally parallel to one another and, most preferably, are substantially coplanar (see FIG. 4).

Although the locating arms 54 are attached to the cutter frame 110, one or more locating arms could be alternatively supported for at least some aspects of the present invention. For instance, in some alternative embodiments, one or more locating arms could be attached directly to the tensioner frame.

Figure 5:
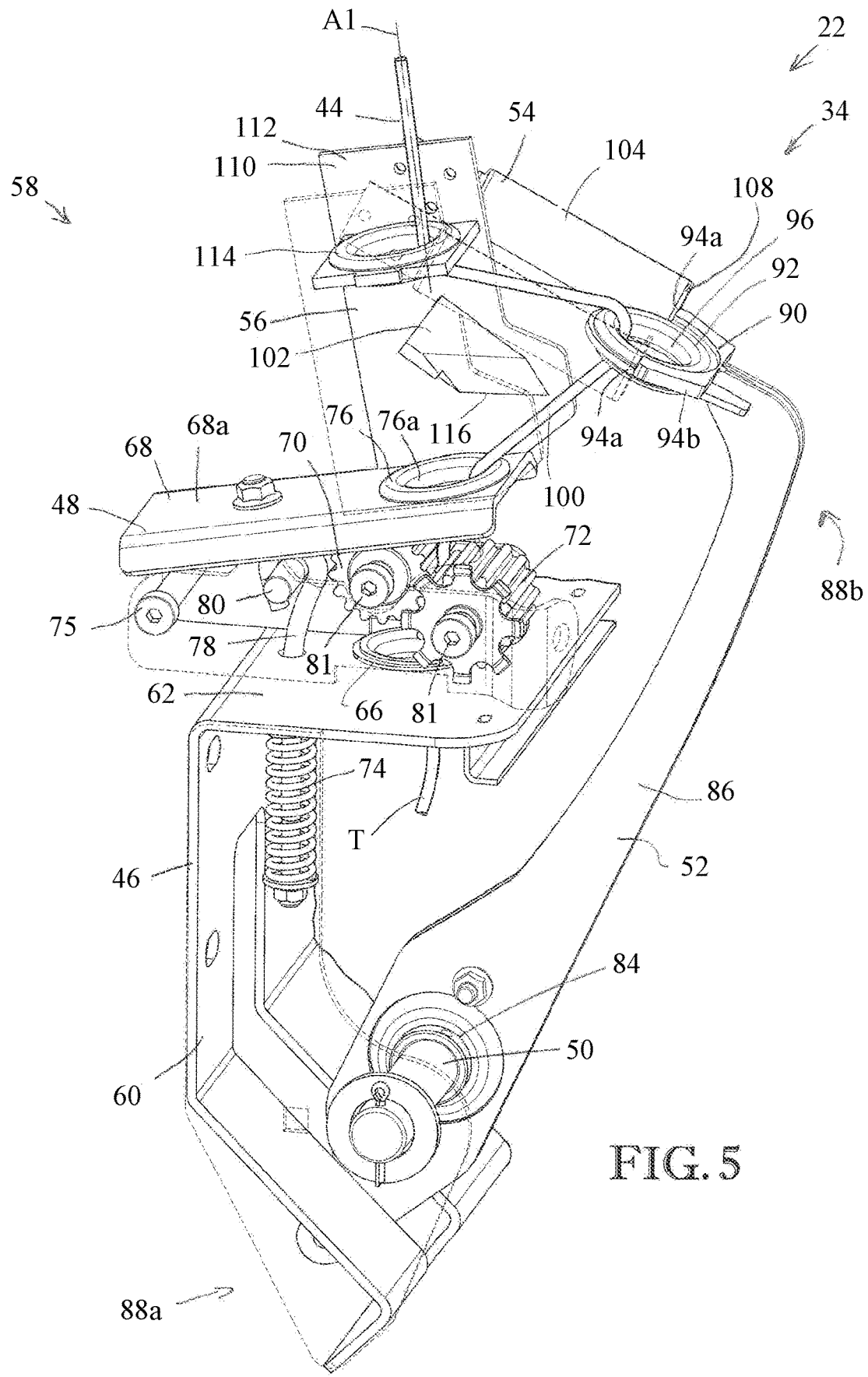
FIG. 5 is a fragmentary perspective of the twine tensioner similar to FIG. 4, but taken from a side angle.

Again, the slacker arm 52 is swingable into and out of the twine feed position associated with upward advancement of the tensioned twine section 44 (see FIGS. 4-6). In the twine feed position, the guide element 90 engages the locating arms 54 and positions the twine T to define the offset twine section 100, which is spaced from the blade 102. This tensioner arrangement provides an important operating condition prior to the occurrence of an over-tension condition.

Preferably, the slacker arm 52 is also configured to shift past the stops 108 toward the severed twine position when the guide element 90 shifts out of the twine feed position toward the twine feed axis A1, particularly during a twine over-tension condition (see FIG. 7).

The slacker arm 52 is shiftable along the arm path P from the twine feed position toward the severed twine position by shifting past the stops 108 of the locating arms 54. As the guide element 90 is urged against the stops 108 of the locating arms 54, the guide element 90 flexes one or both of the locating arms 54 so that the flexible bodies 104 are bowed in a laterally outboard direction (see FIG. 4). Such flexing of the locating arms 54 also produces slight shifting of the stops 108 so that edges 108b of the stops 108 move toward the twine feed axis A1 and the stop surfaces 108a slope inwardly (see FIG. 4).

When the force applied to the stops 108 by the guide element 90 is further increased, the shoulders 94a of the guide element 90 are configured to slide along the sloped stop surfaces 108a until the shoulders 94a move beyond the edges 108b and out of engagement with the stops 108.

Once the shoulders 94 become disengaged from the stops 108, the slacker arm 52 is swingable so that the guide element 90 can move to a location alongside the blade 102 of the twine cutter 56. The slacker arm 52 moves the offset twine section 100 into cutting engagement with the blade edge 116. The slacker arm 52 engages the tensioner frame 46 in the severed twine position at a location spaced from the pivot joint 75.

With the offset twine section 100 severed, the slacker arm 52 is configured to swing away from the blade 102 and toward the twine slack position. The spring 98 urges the slacker arm 52 to swing away from the blade 102. In particular, the cam surfaces 94b engage the stops 108 and urge the stops 108 away from each other to permit movement of the guide element 90 beyond the stops 108 toward the twine slack position.

When the twine T has been severed, operation of the baler 20 is preferably stopped to allow baler maintenance. For instance, it will be understood that the baler could include a baler system to automatically stop baler operation when the baler system senses a severed twine condition. Additionally or alternatively, the baler system could be configured to sense a severed twine condition and provide a warning or alert (such as a visual and/or audible warning indicator) to the operator (e.g., for manually stopping the baler).

In operation, strands of twine T are advanced upwardly by the needle assembly 32 and through the twine tensioner 34 during the advancement stroke of the bale tie cycle. During advancement, the twine T is tensioned and urges the slacker arm 52 into the twine feed position. In particular, the twine T applies a force to the guide element 90 that counteracts the force applied by the spring 98 and generally urges the guide element into engagement with the locating arms 54.

If a strand of twine T becomes over-tensioned, particularly during the advancement stroke, the slacker arm 52 is shiftable so that the twine T can be severed by the twine cutter 56. Specifically, the slacker arm 52 is configured to shift from the twine feed position toward the severed twine position by shifting past the stops 108, so that the offset twine section 100 is moved into cutting engagement with the blade edge 116.

On the other hand, if the twine T has not been cut as a result of being over-tensioned, the needle assembly 32 shifts out of the baling chamber 24 during a return stroke of the bale tie cycle. The distal needle end 42 moves toward the twine tensioner 34, which may produce an excess amount of twine T between the needle and the twine tensioner 34. The slacker arm 52 is operable to take up an excess amount of twine T by swinging outwardly toward the twine slack position.

Turning to FIGS. 8 and 9, an alternative bale binding mechanism 200 is depicted. For purposes of brevity, the remaining description will focus primarily on the differences of this embodiment relative to the prior embodiment. The bale binding mechanism 200 preferably includes, among other things, a needle assembly 202 and an alternative twine tensioner 204 (see FIGS. 2-4).

The alternative twine tensioner 204 includes a tensioner frame 206, tension devices 208, support shaft 210, slacker arms 212, locating arms 214, alternative twine cutters 216, and sensors 218. The twine tensioner 204 also includes a series of tensioning stations 220. Each tensioning station 220 preferably includes a respective tension device 208, slacker arm 212, a pair of locating arms 214, a twine cutter 216, and a sensor 218.

As in the previous embodiment, the locating arms 214 are operable to engage a guide element 222 in the twine feed position and restrict swinging of the slacker arm 212 associated with shifting of the guide element 222 out of the twine feed position toward the severed twine position.

As described above, it will be understood that one or more locating arms could be alternatively configured. For some aspects of the present invention, the twine tensioner could be constructed so that one or more tensioning stations do not include the locating arms. For instance, the baler could be configured to otherwise restrict movement of the slacker arm toward the severed twine position.

Each sensor 216 is operably associated with a respective slacker arm 212 and guide element 222 to sense slacker arm movement corresponding to a twine over-tension condition.

The depicted bale binding mechanism 200 restricts twine T from being passed out of the twine tensioner 204 in response to a sensed twine over-tension condition.

The sensor 216 is supported (preferably fixed to the upper base wall 62) relative to the twine tensioner frame 206 and is operable to sense when the guide element 222 shifts out of the twine feed position toward the twine feed axis.

It will be appreciated that the sensor may include one of various types of transducers suitable for sensing position and/or movement of the slacker arm. Within the ambit of the present invention, transducers for sensing position of the slacker arm 212 may include, but are not limited to, a proximity sensor (such as a mechanical switch), an electrical device (such as a Hall-effect sensor, resistor, etc.), or an optical sensor (e.g., an optical encoder).

The baler preferably includes a baler system to take one or more corrective actions when the slacker arm 212 has been shifted out of the twine feed position toward the twine feed axis A1 (due to a twine over-tension condition). As will be explained, the baler system preferably actuates the twine cutter 216 when the sensor 218 determines that the slacker arm is shifted out of the twine feed position due to an over-tension condition.

Additionally or alternatively, for at least some aspects of the present invention, the system may be operable to provide a warning or alert (such as a visual and/or audible warning indicator) to the operator.

Each twine cutter 216 preferably includes an actuating device 224 and a blade 226. The blade 226 is preferably shiftable between a retracted position (see FIG. 8), in which the blade 226 is restricted from severing the twine T, and an extended position (see FIG. 9), in which the blade 226 is located to sever twine T (preferably when the twine is shifted into the severed twine position due to a twine over-tension condition).

Within the scope of the present invention, the actuating device 224 preferably includes a device to shift the blade 226 between the retracted position and the extended position. For instance, the actuating device 224 may include a cutter frame 228 and a spring 230 supported by the cutter frame 228 to urge the blade 226 from the retracted position to the extended position. In the retracted position, the spring 230 is compressed (see FIG. 8), and the blade 226 is removably held in the retracted position by an electrically-actuated release element (not shown) of the actuating device 224. Upon receiving a signal from the baler system, the release element may be disengaged to allow the blade 226 to be extended by the spring 230. It will be understood that the blade can be retracted manually or using a powered device. A similar functional result may be achieved if the knife is driven to the extended cutting position when a holding means is released. For instance, a continuous duty solenoid may be configured to hold the knife against the spring and then released so that the spring drives the knife to the cutting position.

In other embodiments, the actuating device may include a motor (such as a linear electric motor or a linear hydraulic motor) to shift the blade between the retracted and extended positions. In such embodiments, the blade 226 is preferably shiftably supported relative to the cutter frame 228 and is actuated by the bale binding mechanism 200 to shift the blade 226 so as to sever the twine T.

Once the sensor 216 senses that a twine over-tension condition has caused the guide element 222 to shift out of the twine feed position toward the twine feed axis, the twine cutter 216 is preferably actuated by the baler system in response to the sensed twine over-tension condition.

The baler system preferably actuates the twine cutter 216 when the sensor 218 determines that the slacker arm 212 is shifted out of the twine feed position due to the over-tension condition.

Additionally or alternatively, for at least some aspects of the present invention, the system may be operable to provide a warning or alert (such as a visual and/or audible warning indicator) to the operator.

When twine has been severed, operation of the bale binding mechanism 200 is preferably stopped to allow baler maintenance. In the depicted embodiment, the baler system preferably severs the twine T and stops baler operation automatically when the system senses a twine over-tension condition. For some aspects of the present invention, the baler system could be configured to sense the over-tension condition and provide a warning or alert (such as a visual and/or audible warning indicator) to the operator for manually stopping the baler.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A baler for forming crop material into a bale, said baler comprising:
    a chassis presenting a baling chamber in which the bale is formed; and
    a bale binding mechanism configured to wrap twine around the bale, said bale binding mechanism including:
        a baling needle shiftable up and down relative to the baling chamber, with the needle being shiftable to advance twine upwardly along an end of the bale;
        a twine tensioner configured to maintain tension on a tensioned twine section extending between the twine tensioner and the needle, with the tensioned twine section defining a twine feed axis,
        said twine tensioner including a tension device that restricts upward advancement of the tensioned twine section,
        said twine tensioner further including a shiftable guide element,
        said guide element being shiftable into and out of a twine feed position associated with upward advancement of the twine section, with the guide element operable to define an offset twine section offset from the twine feed axis in the twine feed position,
        said twine tensioner including a slacker arm that provides the guide element,
        said slacker arm being supported to swing about an arm axis transverse to the twine feed axis and swingable into and out of the twine feed position; and
        said slacker arm configured to swing into a severed twine position when the guide element shifts out of the twine feed position toward the twine feed axis,
        said twine tensioner including a tensioner frame that swingably supports the slacker arm at a pivot joint, with the slacker arm engaging the tensioner frame in the severed twine position at a location spaced from the pivot joint; and
        a sensor being operably associated with the guide element to sense guide element movement corresponding to a twine over-tension condition occurring upstream of the sensor, with the bale binding mechanism restricting twine from being passed out of the twine tensioner in response to the sensed twine over-tension condition.

2. The baler as claimed in claim 1,
said sensor sensing when the twine over-tension condition causes the guide element to shift out of the twine feed position toward the twine feed axis.

3. The baler as claimed in claim 1,
said twine tensioner including a cutting device that severs the offset twine section in response to the sensed twine over-tension condition, in which the offset twine section moves toward the cutting device.

4. The baler as claimed in claim 3,
said cutting device including a cutter frame supported by the twine tensioner and a blade shiftably supported by the cutter frame to sever the tensioned twine section.

5. The baler as claimed in claim 4,
said offset twine section defining an offset twine axis,
said blade defining a cutting axis extending at an oblique angle to the offset twine axis when the blade severs the offset twine section.

6. The baler as claimed in claim 4,
said blade being actuated by the bale binding mechanism to shift the blade so as to sever the twine section.

7. The baler as claimed in claim 6,
said sensor sensing when the twine over-tension condition causes the guide element to shift out of the twine feed position toward the twine feed axis, with the cutting device being actuated in response to the sensed twine over-tension condition.

8. The baler as claimed in claim 4,
said tension device including a pair of gears and a tension frame supporting the gears and permitting the gears to shift toward and away from each other,
said gears configured to receive the twine in frictional engagement therebetween and restrict upward advancement of the tensioned twine section.

9. The baler as claimed in claim 8,
said cutting device including a cutter frame supported by the tension frame and a blade shiftably supported by the cutter frame to sever the tensioned twine section.

10. The baler as claimed in claim 9,
said offset twine section defining an offset twine axis,
said blade defining a cutting axis extending at an oblique angle to the offset twine axis when the blade severs the offset twine section.

11. The baler as claimed in claim 9,
said tension frame including a grommet and said cutting device including another grommet, with the grommets being operable to position the tensioned twine section,
said blade being located between the grommets.

12. The baler as claimed in claim 1,
said twine tensioner including a slacker arm that provides the guide element,
said sensor being supported relative to the chassis and operable to sense position of the slacker arm.

13. The baler as claimed in claim 12,
said twine tensioner including a tensioner frame that swingably supports the slacker arm at a pivot joint,
said sensor including a proximity sensor supported on the tensioner frame to sense the slacker arm as part of the slacker arm moves adjacent to the tensioner frame in the twine over-tension condition.

\* \* \* \* \*